May 15, 1956 P. E. BOUFFARD 2,745,566
SELF-LOADING AND UNLOADING VEHICLE CARRIER
Filed June 9, 1954 2 Sheets-Sheet 1

INVENTOR
PAUL EMILE BOUFFARD
BY
ATTORNEY

May 15, 1956 P. E. BOUFFARD 2,745,566

SELF-LOADING AND UNLOADING VEHICLE CARRIER

Filed June 9, 1954 2 Sheets-Sheet 2

INVENTOR
PAUL EMILE BOUFFARD
By H. S. Hendry
ATTORNEY ial loader.
United States Patent Office 2,745,566
Patented May 15, 1956

2,745,566

SELF-LOADING AND UNLOADING VEHICLE CARRIER

Paul Emile Bouffard, Matane, Quebec, Canada

Application June 9, 1954, Serial No. 435,501

1 Claim. (Cl. 214—505)

My invention relates to a material loader.

More particularly, the invention relates to a self-loading and unloading vehicle carrier.

In a loader according to the invention, a load of the material to be carried or transported is loaded onto a platform, and the loaded platform is then lifted or raised onto the body or frame of a dump truck, when the body is in dumping position, by means (including a power-operated winch and cable) carried by the chassis of the truck and operated by a power plant forming part of the truck. After the loaded platform is resting upon the body, the body is lowered to its normal or horizontal position. When the load has been carried to its destination, it is unloaded off the body by tilting the body rearwardly, the descent of the load being controlled by the winch.

The invention is particularly useful in the pulp wood industry, but may find many other useful applications when the material can be loaded into, and held in, a definite pattern upon a platform, or loosely carried in a container.

The principal object of the invention is to provide a new and useful loader and carrier.

A specific object is to provide a dump truck adapted conveniently to lift a unit load-supporting platform or container onto its pivoted frame or body when in rearwardly tilted position, to carry the unit to its destination where it is conveniently unloaded.

In the drawings, wherein like numerals of reference indicate corresponding parts in the various figures, Figure 1 is a more or less diagrammatic, fragmentary side elevation of the loader and carrier;

Figure 1:
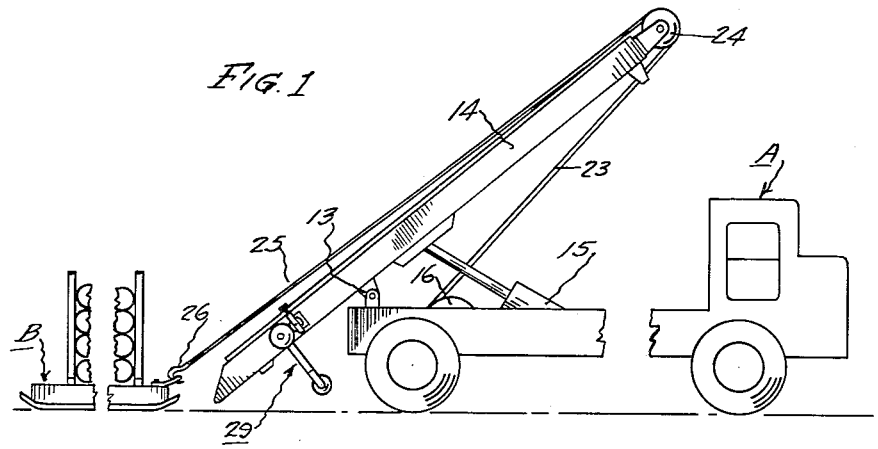

Referring now by numerals to the drawings, A shows a truck of the dump type, including a chassis 11 and a conventional engine 11A having a power-take-off 12.

Pivotally carried by the rear end of the chassis as at 13, is a member in the form of a rectangular frame 14. The frame is rotated on its axis 13 between a substantially horizontal position, resting upon the chassis, and a rearwardly tilted or inclined position, by a conventional hydraulic hoist shown generally as 15.

B is a material loading platform, in the form of a rectangular frame, including two longitudinally extending side angle irons 30 serving as slides. The platform thus may be drawn over the ground as a sled, the irons sliding on the ground.

Rotatably carried by the chassis 11 is a drum 16. Conveniently, the shaft 17 of the drum is journalled in brackets 18 carried by the chassis. One end of the shaft 17 extends beyond one of the brackets 18 and has fixed thereto a worm 19 meshing with a worm gear 20. The worm is operatively coupled to the power-take-off as by shafting 21 and universal couplings 22.

A cable 23 has one end anchored to the drum 16 to be wound therearound, and is looped back over a sheave or pulley 24 freely journalled adjacent the forward end of the frame 14, to present a length or portion 25 adapted to extend to and beyond the rear end of the frame. The free end of this portion carries a hook 26 adapted to hook into an eye or hitch member 27 secured to the sled or platform B, to attach the sled to the truck or detach the sled from the truck.

Preferably, the rear end of the frame 14, which extends rearwardly beyond its pivotal support or axis 13, is provided with a retractable mechanism 29 which, when in one (extended) position, is adapted operatively to engage the ground and prevent further raising of the frame 14, and when in its other (retracted) position, enables the frame to be raised to its fully raised position as determined by the full stroke of the hydraulic hoist, as seen in Figure 1.

Figure 5:
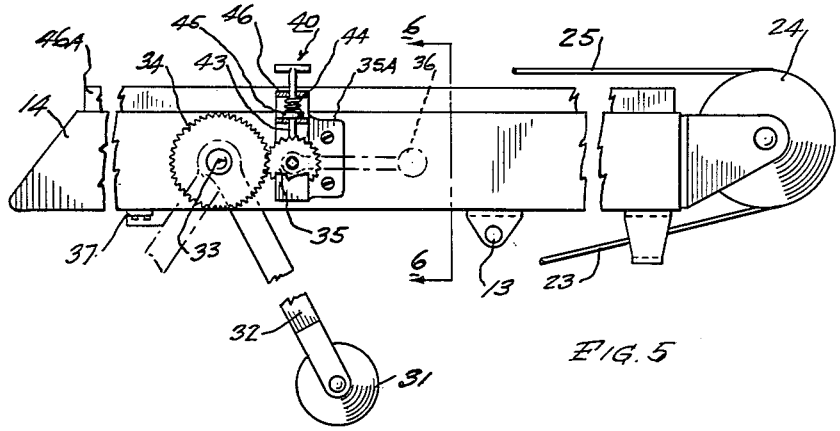
Figure 5 is a fragmentary side elevation, on an enlarged scale, of the tiltable frame of the truck.
Figure 6:
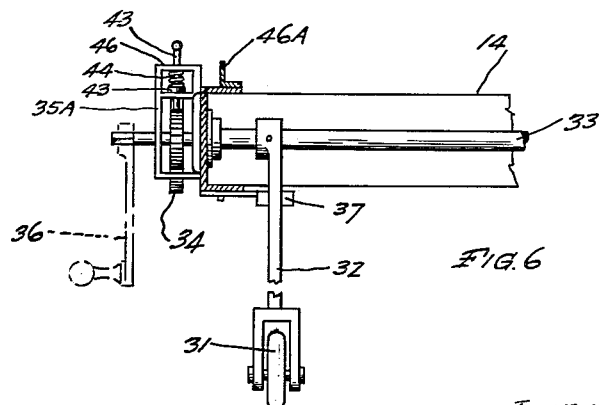
Figure 6 is a section on line 6—6 in Figure 5.

As shown, this mechanism 29 may comprise a ground-engaging wheel 31 freely rotatable in the lower end of an arm 32 fixed on a transverse shaft 33 journalled in the frame 14. One end of the shaft, which extends through the frame, has a gear 34 fixed thereto. Meshing with the gear 34 is a gear 35, of smaller diameter, rotatable in a bracket 35A secured to the frame. The gear 35 is rotated by a removable crank 36, so that, likewise, the shaft 33 is rotated by the crank to lower and raise the ground-engaging wheel 31. The clockwise rotation of the shaft 33 (as seen in Figure 5) is determined by the engagement of the arm 32 with a lug or stop 37 secured to the frame. If preferred, two such ground-engaging wheels may be used.

In order to retain the mechanism in its normal or inoperative position, as seen in Figure 5, a spring-loaded latch device 40, is used. As shown, the device may comprise a bolt 43 vertically displaceable in the bracket 35A and having its lower end adapted to engage between two successive teeth or cogs of the gear 35. A spring 44, tensioned between a shoulder 45 formed on the bolt and a transverse portion 46 of the bracket, tends to move the bolt downwardly to engage the gear.

If preferred, the hand-operated mechanism 29 may be replaced by a suitable hydraulically-operated mechanism actuated from the hydraulic fluid operating the hydraulic hoist.

The loaded platform B is guided onto, to become supported by, the frame 14, by the side angles 30 engaging and resting upon the frame, more particularly on angles or guides 46, longitudinally carried by the frame 14.

In practice, a fleet of platforms B are provided for one truck. While a truck carries a loaded platform to its destination, the loading of the other platforms proceeds. Thus, the truck is not idle while loading a platform or platforms proceeds. The loading of the material, say logs, onto the platform or sled lying upon the ground is easier and faster than loading the logs onto a truck; therefore, more logs may be loaded for transportation to a certain destination by the use of the invention than by the conventional practice of loading the logs directly onto the truck.

Figure 2:
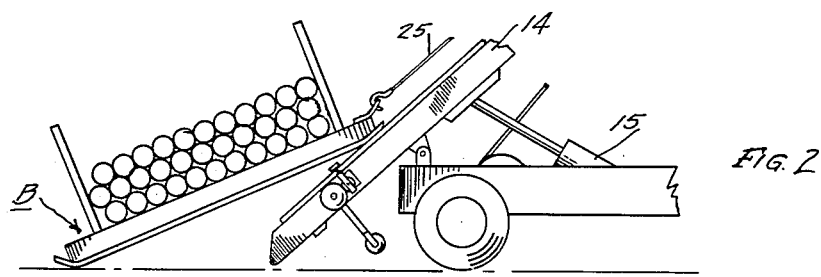
Figures 2 and 3 are diagrammatic views graphically illustrating two successive steps in the lifting of the load onto the truck.

To lift the loaded platform B onto the dump truck or carrier, the frame 14 is raised or tilted rearwardly to its ultimate or maximum inclined position (as seen in Figure 1) by operating the hoist. The truck is backed to within a short distance of the loaded platform, and the hook 26 of the cable 25 hooked or hitched to the platform. The rear end of the frame 14 will now be close to the ground. The brakes of the truck are released, and drum 16 rotated to wind the cable; the truck will now move rearwardly. When the rear end of the frame is close to the platform, the brakes are again applied. The forward end of the platform is lifted by the cable to above the lower end of the frame until the platform, more particularly the side angles 30, engage the frame, as seen in Figure 2.

As the forward end of the platform, riding on the frame, reaches a point forwardly of the axis 13, the frame lowers toward its horizontal position until the frame is parallel with the platform. The mechanism 29 is now operated to bring the wheel 31 to the ground, and the device locked in that operative position by releasing the spring-loaded bolt 43.

Figure 3:
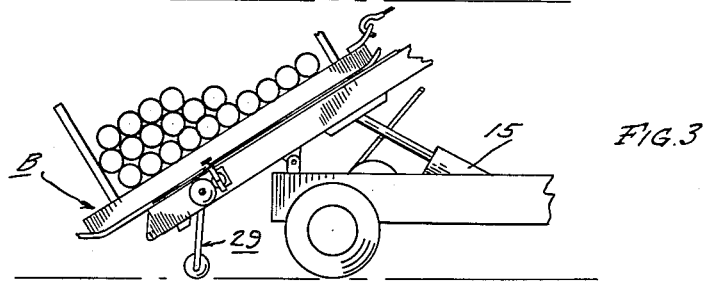
Figures 7, 8:
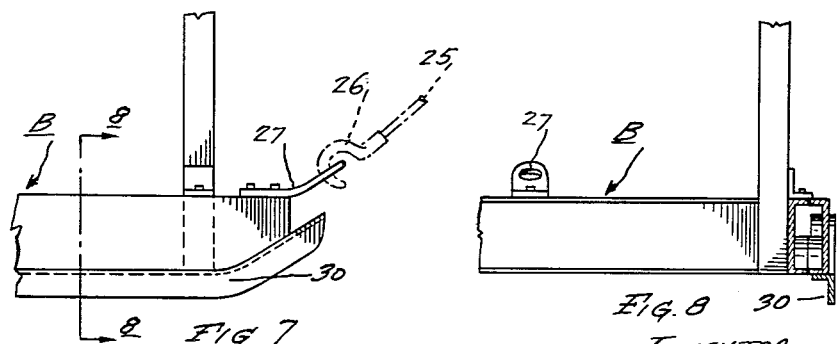
Figure 7 is a fragmentary side elevation of the platform.
Figure 8 is a section on line 8—8 in Figure 7.
Figure 4:
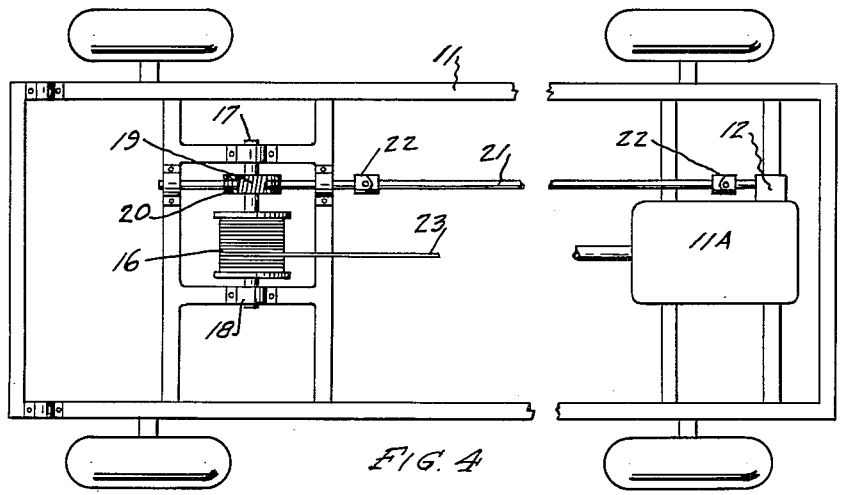
Figure 4 is a fragmentary plan view of the chassis.

The use of such a device is highly desirable, since otherwise, the frame would tend to tilt rearwardly as the rear of the platform clears the ground, as seen in Figure 3, and as in practice, the centre of gravity of the loaded platform lies rearwardly of the axis 13 until the platform has been drawn forwardly well toward the front of the truck.

When the platform is in its fully raised position on the frame, the frame is lowered by the hoist to its normal horizontal position, and the dump truck driven to the site where the platform is to be unloaded. The platform is unloaded, as already stated, by again tilting the frame, and controlling the descent of the platform by means of the winch.

What I claim is:

In a self-loading and unloading vehicle carrier, the combination of a load-carrying platform; a self-powered dump truck including a chassis and a frame pivotally supported by said chassis for displacement between a substantially horizontal position overlying said chassis and a fully-rearwardly tilted position, said frame extending rearwardly of its pivotal support to present its rearward end adjacent to the ground when in fully-tilted position; a drum carried by said chassis and operatively coupled to the engine of said dump truck; a sheave freely journalled on said frame adjacent the forward end thereof; a cable wound on said drum and looped over said sheave to present its free end for attachment to one end of said platform to lift said platform onto said frame when said frame is tilted; and adjustable means carried by said frame rearwardly of its pivotal support manually operable effectively to engage the ground selectively to determine the tilted position of said frame other than its fully-tilted position, when the weight of said platform tends to tilt said frame rearwardly, said frame and said platform having co-operating track means for guiding said platform on said frame as said platform is being lifted onto said frame, one of said means also serving as slides on which said platform may be slid over the ground.

References Cited in the file of this patent

UNITED STATES PATENTS

| | | |
|---|---|---|
| 1,840,666 | Grundon | Jan. 12, 1932 |
| 2,354,337 | Smith | July 25, 1944 |
| 2,405,299 | Godwin | Aug. 6, 1946 |
| 2,550,230 | Dalton | Apr. 24, 1951 |
| 2,598,517 | Drott | May 27, 1952 |
| 2,613,827 | Van Doorne | Oct. 14, 1952 |
| 2,621,814 | Lisota | Dec. 16, 1952 |